(12) United States Patent
Kuroki et al.

(10) Patent No.: US 8,254,061 B2
(45) Date of Patent: Aug. 28, 2012

(54) HEAD-SLIDER WITH PROTRUSION CONTROL STRUCTURE AND MANUFACTURING METHOD OF THE HEAD-SLIDER WITH PROTRUSION CONTROL STRUCTURE

(75) Inventors: Kenji Kuroki, Kanagawa (JP); Masafumi Mochizuki, Kanagawa (JP); Toshiya Shiramatsu, Kanagawa (JP)

(73) Assignee: Hitachi Global Storage Technologies, Netherlands B.V., Amsterdam (NL)

( * ) Notice: Subject to any disclaimer, the term of this patent is extended or adjusted under 35 U.S.C. 154(b) by 261 days.

(21) Appl. No.: 12/616,033

(22) Filed: Nov. 10, 2009

(65) Prior Publication Data

US 2010/0118442 A1 May 13, 2010

(30) Foreign Application Priority Data

Nov. 11, 2008 (JP) ................................ 2008-289311

(51) Int. Cl.
G11B 5/60 (2006.01)
(52) U.S. Cl. .................................................. 360/234.4
(58) Field of Classification Search ................ 360/234.4
See application file for complete search history.

(56) References Cited

U.S. PATENT DOCUMENTS

| | | | |
|---|---|---|---|
| 5,991,113 A * | 11/1999 | Meyer et al. | 360/75 |
| 6,999,280 B2 | 2/2006 | Otsuka | |
| 7,042,674 B1 * | 5/2006 | Baril et al. | 360/75 |
| 2003/0174430 A1 * | 9/2003 | Takahashi et al. | 360/75 |
| 2004/0037012 A1 | 2/2004 | Nakanishi et al. | |
| 2005/0174686 A1 * | 8/2005 | Takano | 360/126 |
| 2005/0270694 A1 * | 12/2005 | Umehara et al. | 360/126 |
| 2006/0262445 A1 * | 11/2006 | Takano | 360/1 |
| 2007/0058280 A1 * | 3/2007 | Wada et al. | 360/75 |
| 2007/0097548 A1 * | 5/2007 | Taguchi | 360/126 |
| 2007/0195449 A1 * | 8/2007 | Feist et al. | 360/75 |
| 2007/0247750 A1 | 10/2007 | Hsiao et al. | |
| 2007/0258168 A1 * | 11/2007 | Lee et al. | 360/234 |
| 2008/0088979 A1 | 4/2008 | Nakata | |
| 2008/0094755 A1 * | 4/2008 | Ota et al. | 360/235.4 |
| 2009/0040659 A1 * | 2/2009 | Nakamura et al. | 360/234.3 |

* cited by examiner

Primary Examiner — David D Davis

(57) ABSTRACT

A head-slider. The head-slider includes a slider and a magnetic-recording head formed on the slider. The magnetic-recording head includes a main pole, a return pole to which a recording magnetic field from the main pole returns, a sensor element, a shield provided between the sensor element and the main pole, and a heater element for adjusting a shape of a flying surface of the magnetic-recording head. The magnetic-recording head further includes a first recess provided at a tip end face of at least one element selected from the group consisting of the return pole and the shield, and a second recess provided on an exposed flying surface and corresponding to the first recess.

14 Claims, 10 Drawing Sheets

(a)

(b)

(c)

HEAD-SLIDER WITH PROTRUSION CONTROL STRUCTURE AND MANUFACTURING METHOD OF THE HEAD-SLIDER WITH PROTRUSION CONTROL STRUCTURE

CROSS-REFERENCE TO RELATED APPLICATION

This application claims priority from the Japanese Patent Application No. 2008-289311, filed Nov. 11, 2008, the disclosure of which is incorporated herein in its entirety by reference.

TECHNICAL FIELD

Embodiments of the present invention relate to a head-slider and a manufacturing method of a head-slider.

BACKGROUND

Disk drive using various kinds of disks, such as optical disks, magneto-optical disks, flexible magnetic-recording disks and similar disks for data-storage are in the art. In particular, hard disk drives (HDDs) have been widely used as data-storage devices that have proven to be indispensable for contemporary computer systems. Moreover, HDDs have found widespread application to motion picture recording and reproducing apparatuses, car navigation systems, cellular phones, and similar devices, in addition to the computers, because of their outstanding information-storage characteristics.

An HDD includes a magnetic-recording disk and a head-slider; data on the magnetic-recording disk is read and written with the head-slider. To increase recording capacity per unit area on the magnetic-recording disk, the areal density of magnetically recorded information is increased. However, reduction in recording bit length may not cause an increase in areal density because of thermal fluctuation in magnetization of the medium. Generally, influence by the thermal fluctuation will increase as the value of $K_u V/kT$ is smaller, where $K_u$ is a magnetic anisotropy constant of the magnetic-recording medium, V is a minimum volume of a unit of magnetization, for example, magnetic grain size, k is Boltzmann's constant, and T is absolute temperature. Accordingly, to increase areal density $K_u$, or alternatively, V, are made greater so as to reduce the influence of the thermal fluctuation.

To address this issue, a perpendicular magnetic-recording (PMR) method has been developed that records magnetic signals perpendicularly onto a double-layered PMR medium having a soft-magnetic underlayer with a probe-pole write element. This method may apply a stronger recording magnetic field to the magnetic-recording medium. Therefore, a magnetic-recording recording layer of a magnetic-recording disk with a large magnetic anisotropy constant, $K_u$, may be used. Moreover, in a magnetic-recording disk in the PMR method, increase in V may be achieved by growing magnetic particles in the film thickness direction while maintaining the magnetic particle diameter on the magnetic-recording medium surface small, or maintaining the bit length small.

Magnetic-recording disks used in an HDD have multiple concentric data tracks and servo tracks provided. Each servo track includes servo data sectors containing address information. Each data track also includes a plurality of recorded data sectors containing user data. Between servo sectors provided discretely in the circumferential direction, data sectors are recorded. A magnetic-recording head of a head-slider, which is supported by a rotary actuator, accesses a selected data sector in accordance with address information contained in the servo data, and writes data to the data sector, or alternatively, reads data from the data sector.

To increase the recording density of a magnetic-recording disk, the spacing between a magnetic-recording head flying in proximity to the recording surface of the magnetic-recording disk and the magnetic-recording disk, as well as variations in the spacing, are reduced. One technique to control the spacing provides a heater in a head-slider; the heater heats the magnetic-recording head to adjust the spacing, which is referred to herein by the term of art, "thermal fly-height control" (TFC). TFC applies current to the heater to generate heat, causing protrusion of the magnetic-recording head by thermal expansion. This reduces the spacing between the magnetic-recording disk and the magnetic-recording head. Scientists and engineers engaged in HDD design, manufacturing and development are interested in controlling the reduction in spacing to meet the ever increasing demands for reliability and performance from the HDD market.

SUMMARY

Embodiments of the present invention include a head-slider. The head-slider includes a slider and a magnetic-recording head formed on the slider. The magnetic-recording head includes a main pole, a return pole to which a recording magnetic field from the main pole returns, a sensor element, a shield provided between the sensor element and the main pole, and a heater element for adjusting a shape of a flying surface of the magnetic-recording head. The magnetic-recording head further includes a first recess provided at a tip end face of at least one element selected from the group consisting of the return pole and the shield, and a second recess provided on an exposed flying surface and corresponding to the first recess.

DESCRIPTION OF THE DRAWINGS

The accompanying drawings, which are incorporated in and form a part of this specification, illustrate embodiments of the invention and, together with the description, serve to explain the embodiments of the present invention.

The drawings referred to in this description should not be understood as being drawn to scale except if specifically noted.

DESCRIPTION OF EMBODIMENTS

Reference will now be made in detail to the alternative embodiments of the present invention. While the invention will be described in conjunction with the alternative embodiments, it will be understood that they are not intended to limit the invention to these embodiments. On the contrary, the invention is intended to cover alternatives, modifications and equivalents, which may be included within the spirit and scope of the invention as defined by the appended claims.

Figure 9:
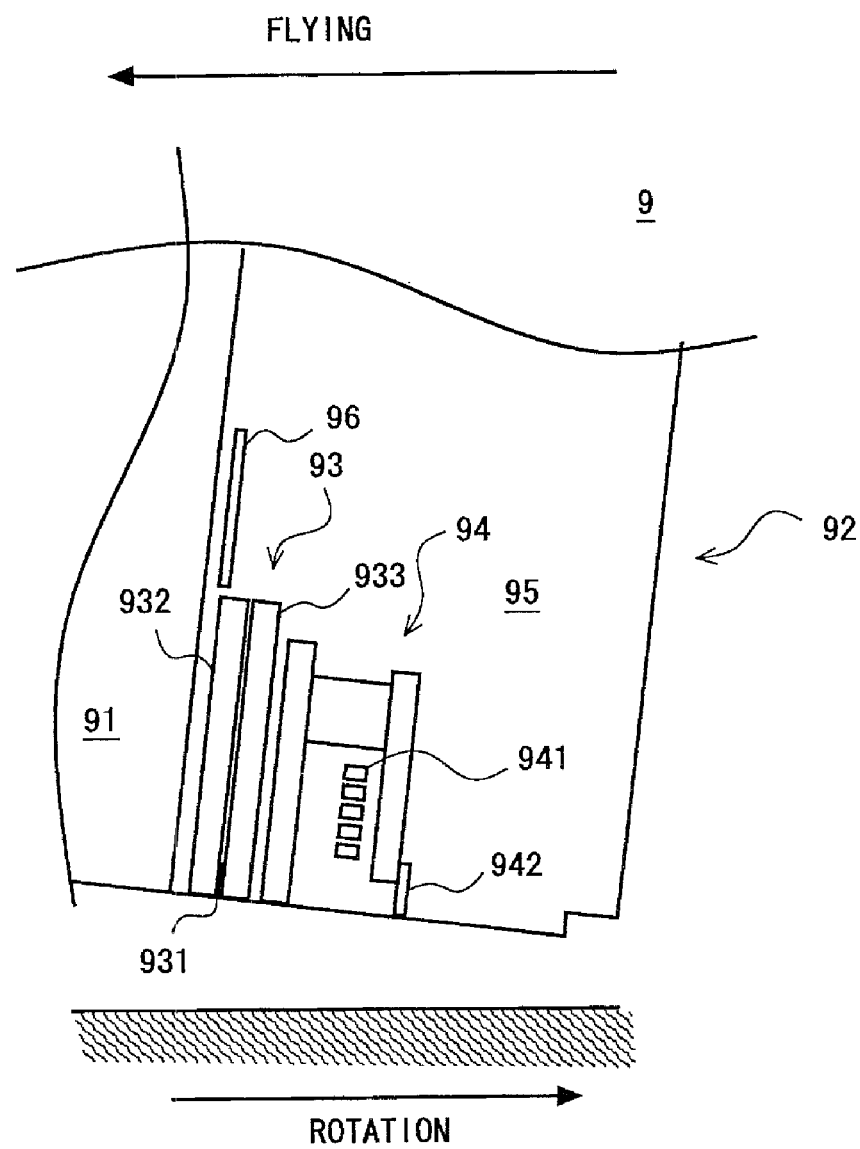
FIG. 9 is an example drawing schematically depicting the structure of a magnetic-recording head, according to conventional art with relevance to embodiments of the present invention.

Furthermore, in the following description of embodiments of the present invention, numerous specific details are set forth in order to provide a thorough understanding of the present invention. However, it should be noted that embodiments of the present invention may be practiced without these specific details. In other instances, well known methods, procedures, and components have not been described in detail as not to unnecessarily obscure embodiments of the present invention. Throughout the drawings, like components are denoted by like reference numerals, and repetitive descriptions are omitted for clarity of explanation if not necessary. Description of Embodiments of the Present Invention for a Head-Slider with Protrusion Control Structure and Manufacturing Method of the Head-Slider with the Protrusion Control Structure With reference now to FIG. 9, with relevance for embodiments of the present invention, a cross-sectional view is shown that depicts a configuration in the proximity to the trailing edge of a head-slider 9. A slider 91 supports a magnetic-recording head 92. The magnetic-recording head 92 includes a read element 93 and a write element 94. The write element 94 generates a magnetic field from a main pole 942 by electrical current flowing through a recording coil 941 to record magnetic data onto the magnetic-recording disk. The read element 93 includes a sensor element 931, which is a magnetoresistive (MR) element, having magnetic anisotropy and reproduces magnetic data by means of resistance varying depending on the magnetic field from the magnetic-recording disk.

The magnetic-recording head 92 is formed by a thin film deposition process on the slider 91 that includes an aluminum titanium carbide (AlTiC) substrate. The sensor element 931 is sandwiched between magnetic shields 932 and 933. A protective film 95 made of alumina, for example, is formed around the write element 94 and the read element 93. A heater 96 is provided in proximity to the write element 94 and the read element 93. The heater 96 may be formed by winding a thin film resistive element using permalloy, for example, and filling the gap with alumina.

When the heater element 96 is supplied with electrical power, the heat of the heater element 96 deforms the magnetic-recording head to cause protrusion. As the amount of the supplied electrical power increases or decreases, the protrusion amount of the magnetic-recording head 92 correspondingly increases or decreases. On the other hand, the spacing decreases or increases as the amount of the supplied electrical power correspondingly increases or decreases.

As described above, the heat from the heater element causes the expansion and protrusion of the magnetic-recording head, so that the spacing between the magnetic-recording head and the magnetic-recording disk may be adjusted. However, the magnetic-recording head includes a write element and a read element, each of which includes a plurality of elements. Accordingly, the protrusion amount on the disk-facing surface of the magnetic-recording head is not uniform all over the disk-facing surface; but, the protrusion amount varies depending on the position on the disk-facing surface of the magnetic-recording head.

In accordance with embodiments of the present invention, the inventors have found that the difference in the protrusion amount depending on the position on the magnetic-recording head produces a disturbance in reducing the magnetic spacing. The magnetic spacing in recording represents the spacing between a main pole and a recording layer, and the magnetic spacing in reading represents the spacing between a sensor element, which is a MR element, and a recording layer. As used herein, an MR element may be, by way of example without limitation thereto, any of the following: a giant magnetoresistance (GMR) element, a tunneling magnetoresistance (TMR) element, or similar MR element.

With reference now to FIGS. 10(a) and 10(b), with relevance for embodiments of the present invention, examples are shown of profiles of the protrusion amount in a conventional structure of a head-slider. FIG. 10(a) is a profile when the magnetic-recording head contacts a magnetic-recording disk; and, FIG. 10(b) is a profile when the write element records data. The magnetic-recording head which exhibits these profiles includes: a read element having a two shield elements sandwiching the sensor element on the front and the back thereof, which is the front and the back as seen in the slider's traveling direction relative to the magnetic-recording disk; and, a PMR write element having two return poles in front of and behind the main pole. The heater element is located on the upper side of the read element, which is on the opposite side from the flying surface.

As understood from FIG. 10(a), at the contact, the lower return pole P1 protrudes the most and is in contact with the magnetic-recording disk. Next referring to FIG. 10(b), in data recording, the lower return pole P1 protrudes the most as well, while there exists a gap of a little less than 1 nanometer (nm) between the main pole MP and the return pole, so that the main pole is located a little more than 1 nm higher.

TFC is aimed at highly precise reading and writing, so it brings the main pole of the write element and the sensor element of the read element in proximity with the magnetic-recording disk. On the other hand, a spacing margin prevents contact between the magnetic-recording head and the magnetic-recording disk. However, like the above-referenced profiles, if the return pole, other than the main pole and the sensor element, which is a MR element, protrudes the most, the minimum physical spacing with respect to the return pole P1 needs be set to prevent contact between the magnetic-recording head and the magnetic-recording disk. This is a disturbance in reducing the spacing between the main pole, or alternatively, the sensor element, and the magnetic-recording layer, namely the magnetic spacing in reading data from, or alternatively, writing data to, the magnetic-recording disk.

Consequently, in accordance with an embodiment of the present invention, a magnetic-recording-head structure may further reduce the minimum spacing of the main pole and/or sensor element. Moreover, in accordance with an embodiment of the present invention, the spacing between the magnetic-recording head and the magnetic-recording disk and the structure of the magnetic-recording head is extremely microscopic, so a highly precise technique is provided that achieves highly precise reading and writing of magnetic information.

In accordance with embodiments of the present invention, a head-slider includes a slider and a magnetic-recording head formed on the slider. The magnetic-recording head includes a main pole, a return pole to which a recording magnetic field from the main pole returns, a sensor element, a shield provided between the sensor element and the main pole, a heater element for adjusting a shape of a flying surface of the magnetic-recording head, a first recess provided at a tip end face of at least one element selected from the group consisting of the return pole and the shield, and a second recess provided on an exposed flying surface and corresponding to the first recess. Thus, in accordance with an embodiment of the present invention, the magnetic spacing between the magnetic-recording head and the magnetic-recording disk may be reduced to provide easy manufacture of a magnetic-recording head which is capable of reading and writing magnetic information with higher precision. If the first recess is exposed on the flying surface, the first recess and the second recess may be the same recess.

In one embodiment of the present invention, the first recess is partly filled with a non-magnetic insulating film of the magnetic-recording head; and, the tip end face of the non-magnetic insulating film is recessed from the tip end face outside the first recess. Thus, in accordance with an embodiment of the present invention, the second recess having a marginal depth may be easily formed. In another embodiment of the present invention, the head-slider further includes an overcoat deposited on the flying surface of the magnetic-recording head; and, the overcoat has the second recess that is formed corresponding to a shape of the first recess which is partly filled with the non-magnetic insulating film. Thus, in accordance with an embodiment of the present invention, the reliability of the magnetic-recording head may be increased.

In one embodiment of the present invention, the sensor element is formed in a lower layer than the main pole on the slider; the heater element is formed closer to the sensor element than the main pole; the return pole is formed in a layer between the main pole and the sensor element; and, the return pole has the first recess on the tip end face thereof. Thus, in accordance with an embodiment of the present invention, the read element and the write element may be effectively brought into proximity with the magnetic-recording disk using the heater element. In another embodiment of the present invention, the shield is formed in a layer between the return pole and the sensor element; the shield has a third recess in the tip end face thereof; and, the exposed flying surface has a fourth recess corresponding to the third recess. Thus, in accordance with an embodiment of the present invention, in the magnetic spacing control, effects from both of the shield and the return pole may be avoided. In another embodiment of the present invention, if the third recess is exposed on the flying surface, the third recess is the fourth recess.

In one embodiment of the present invention, the first recess of the return pole is through the return pole in a stacking direction of the magnetic-recording head; and, the third recess of the shield is formed on the edge between the tip end face and the end face opposite to the return pole. Thus, in accordance with an embodiment of the present invention, undesirable effects due to the shield effect may be reduced. In another embodiment of the present invention, the shield includes a plurality of stacked layers and the third recess is formed in one layer of the plurality of layers. Thus, in accordance with an embodiment of the present invention, various shapes of the recess may be attained easily.

In one embodiment of the present invention, the first recess is formed on an edge between one end face in a stacking direction of the magnetic-recording head and the tip end face. Thus, in accordance with an embodiment of the present invention, effects to the original functions of the elements may be reduced. In another embodiment of the present invention, one of the elements selected from the group consisting of the return pole and the shield includes a plurality of stacked layers; and; the first recess is formed in one of the plurality of layers. Thus, in accordance with an embodiment of the present invention, various shapes of the recess may be attained easily.

In accordance with embodiments of the present invention, a manufacturing method of a head-slider including a slider and a magnetic-recording head formed on the slider is provided. The method includes forming a write element including a main pole and a return pole on the slider that includes an AlTiC substrate. The method includes forming a read element including a sensor element and a shield between the main pole and the sensor element on the substrate. The method includes forming a heater element for adjusting a shape of a flying surface of the magnetic-recording head on the substrate. The method includes forming a non-magnetic insulating layer surrounding the write element, the read element, and the heater element such that the non-magnetic insulating film fills a recess formed on the tip end face of at least one element selected from the group consisting of the return pole and the shield. The method includes removing a portion of the non-magnetic insulating film in the recess by dry-etching the flying surface to partly expose the recess after forming the write element, the read element, the heater element, and the non-magnetic insulating film. Thus, in accordance with an embodiment of the present invention, the magnetic spacing between the magnetic-recording head and the magnetic-recording disk may be reduced to provide easy manufacture of a magnetic-recording head which is capable of reading and writing magnetic information with higher precision.

In accordance with embodiments of the present invention, the magnetic spacing between a magnetic-recording head and a magnetic-recording disk may be reduced to provide highly precise reading and/or writing of magnetic information. Embodiments of the present invention are subsequently described in which a hard-disk drive (HDD) is used as an example of a disk drive. One embodiment of the present invention includes a structure of a magnetic-recording head in a head-slider, which may be mounted in the HDD. In another embodiment of the present invention, the write element of a head-slider is the write element of a PMR head. The write element of the PMR head includes a main pole for generating magnetic flux, which changes the magnetization of the magnetic-recording layer of a magnetic-recording disk, and a return pole to which the magnetic flux returns. The read element includes a sensor element, which is a MR element, and a shield between the sensor element and the write element. The sensor element converts magnetic information into an electrical signal.

Moreover, in another embodiment of the present invention, the HDD adjusts the spacing between the magnetic-recording head and the magnetic-recording disk through TFC. TFC adjusts the spacing by the thermal expansion of the magnetic-recording head caused by the heat from a heater element within the head-slider. The TFC adjusts the magnetic spacing, the distance between the main pole and the magnetic recording layer, or alternatively, the distance between the sensor element and the magnetic recording layer. In yet another embodiment of the present invention, the magnetic-recording-head structure includes a recess provided in the return pole of the write element and/or in the shield of the read element. In another embodiment of the present invention, another recess is formed in the exposed flying surface of the magnetic-recording head along with the recess. The recess reduces the effects of the protrusion of the return pole and/or the shield on magnetic spacing control.

Figure 1:
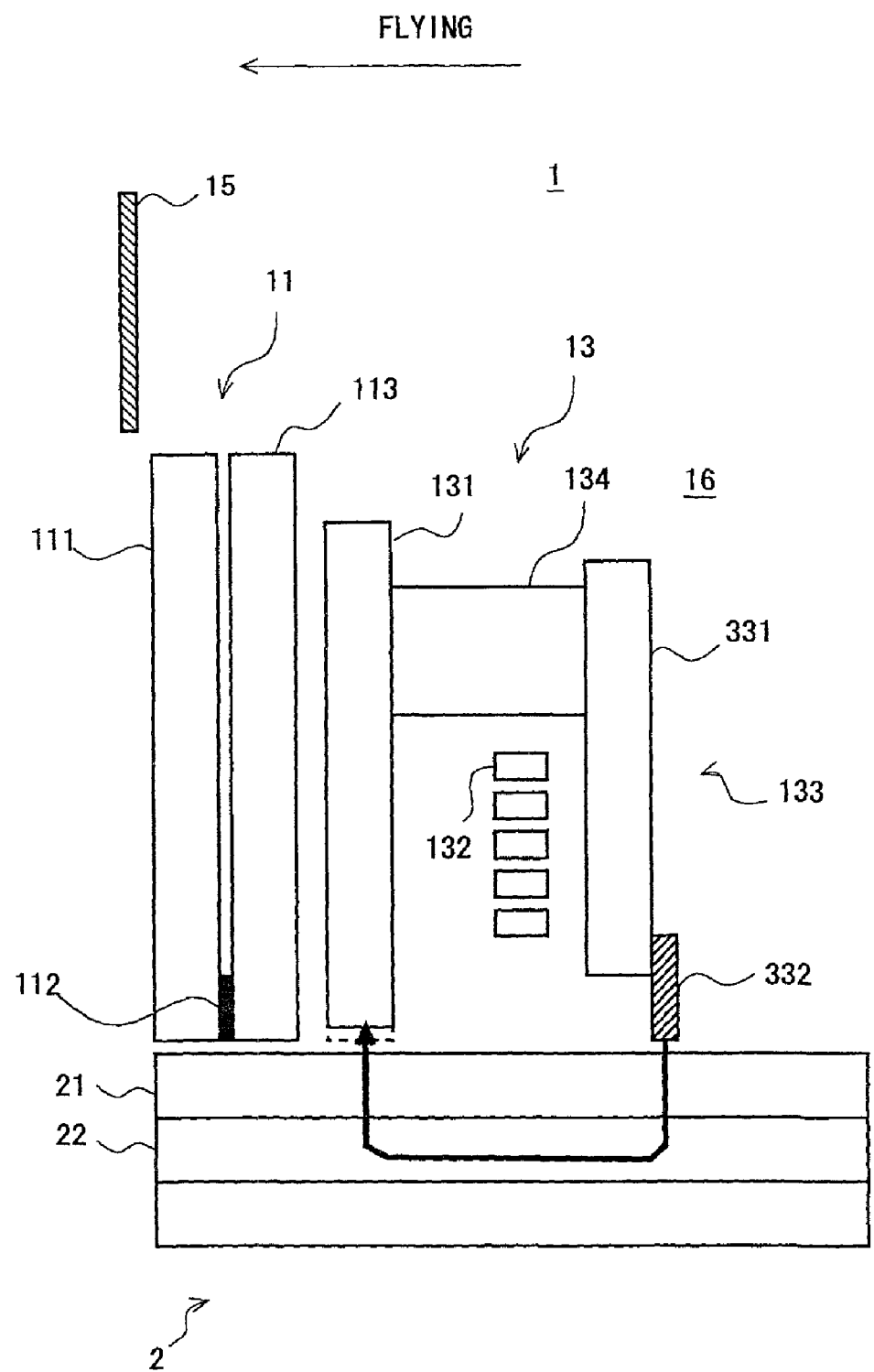
FIG. 1 is an example drawing schematically depicting the structure of a magnetic-recording head, in accordance with an embodiment of the present invention.

With reference now to FIG. 1, in accordance with embodiments of the present invention, a drawing is shown that schematically depicts the structure of a magnetic-recording head 1. FIG. 1 shows the initial state when the heater power is zero. As described herein, subsequent drawings are shown for the magnetic-recording head 1 in the same initial state with the heater power set to zero. The magnetic-recording head 1 includes a read element 11, a write element 13, and a heater element 15. The magnetic-recording head 1 is formed on a slider; in FIG. 1, the read element 11 is formed on the slider, which is a substrate, and the write element 13 is formed above the read element 11. The rotational direction of a magnetic-recording disk 2 is from the left of FIG. 1 toward the right. In other words, the magnetic-recording head 1 travels, in other words, flies, from the right of FIG. 1 toward the left relative to the magnetic-recording disk 2.

In FIG. 1, the fore side of the flying magnetic-recording head 1 is referred to as a leading-edge side and the aft side thereof is referred to as a trailing-edge side. In the configuration of FIG. 1, the read element 11 is located towards the leading-edge side and the write element 13 is towards the trailing-edge side. The read element 11 includes a lower shield 111, a sensor element 112, which is a MR element, and an upper shield 113, which are stacked in this order from the leading-edge side. The sensor element 112 is sandwiched between the two shields 111 and 113 made of magnetic metal. The write element 13 includes a return pole 131, a thin film coil 132, and a main pole 133, which are stacked in this order from the leading-edge side. The two poles are made of magnetic metal.

The main pole 133 includes a main pole yoke 331 and a main pole tip 332. These are made of magnetic metal. The main pole yoke 331 is connected to the return pole 131 through a back-gap portion 134. The main pole tip 332 is joined with the tip of the main pole yoke 331 on the magnetic-recording-disk side. The main pole tip 332 defines the data track width.

The magnetic field flowing from the main pole 133 passes through a magnetic-recording layer 21 of the magnetic-recording disk 2 and a soft-magnetic underlayer 22 thereof, and enters the return pole 131, forming a magnetic circuit. This magnetic field records a magnetization pattern onto the magnetic-recording layer 21. Between the magnetic-recording layer 21 and the soft-magnetic underlayer 22, an intermediate layer may be provided. In addition, as a MR element, a giant magnetoresistance element (GMR), a tunnel magnetoresistance element (TMR), or similar MR element may be used as the sensor element 112, which is the MR element, of the read element 11. The magnetic field from the magnetic-recording layer 21 changes the resistance of the sensor element 112. The sensor element converts the change in the magnetization of the magnetic-recording layer into an electrical signal in accordance with the change in the resistance.

The heater element 15 is formed in the layer between the lower shield 111 and the slider body towards the leading-edge side thereof, which is under the lower shield 111, and on the opposite side, which is the far side, from the flying surface that faces the magnetic-recording disk 2, relative to the read element 11. The heater element 15 may be made of a winding thin film resistive element using permalloy. The read element 11, the write element 13, and the heater element 15 and the constituting elements thereof are surrounded by a non-magnetic insulating film 16 made of, for example, alumina. The flying surface of the magnetic-recording head 1 for facing the magnetic-recording disk 2 is coated with a carbon overcoat (not shown in FIG. 1).

When the heater element 15 is supplied with electrical power, the heater element 15 generates heat. The heat expands the read element 11 and the write element 13. The expansion causes protrusion of the read element 11 and the write element 13 toward the magnetic-recording disk 2 to reduce the magnetic spacings thereof. The expansion amount depends on the heating value, which is determined by supplied electrical power, of the heater element 15; the control of the heater element 15 leads to the control of the magnetic spacing.

Figure 10:
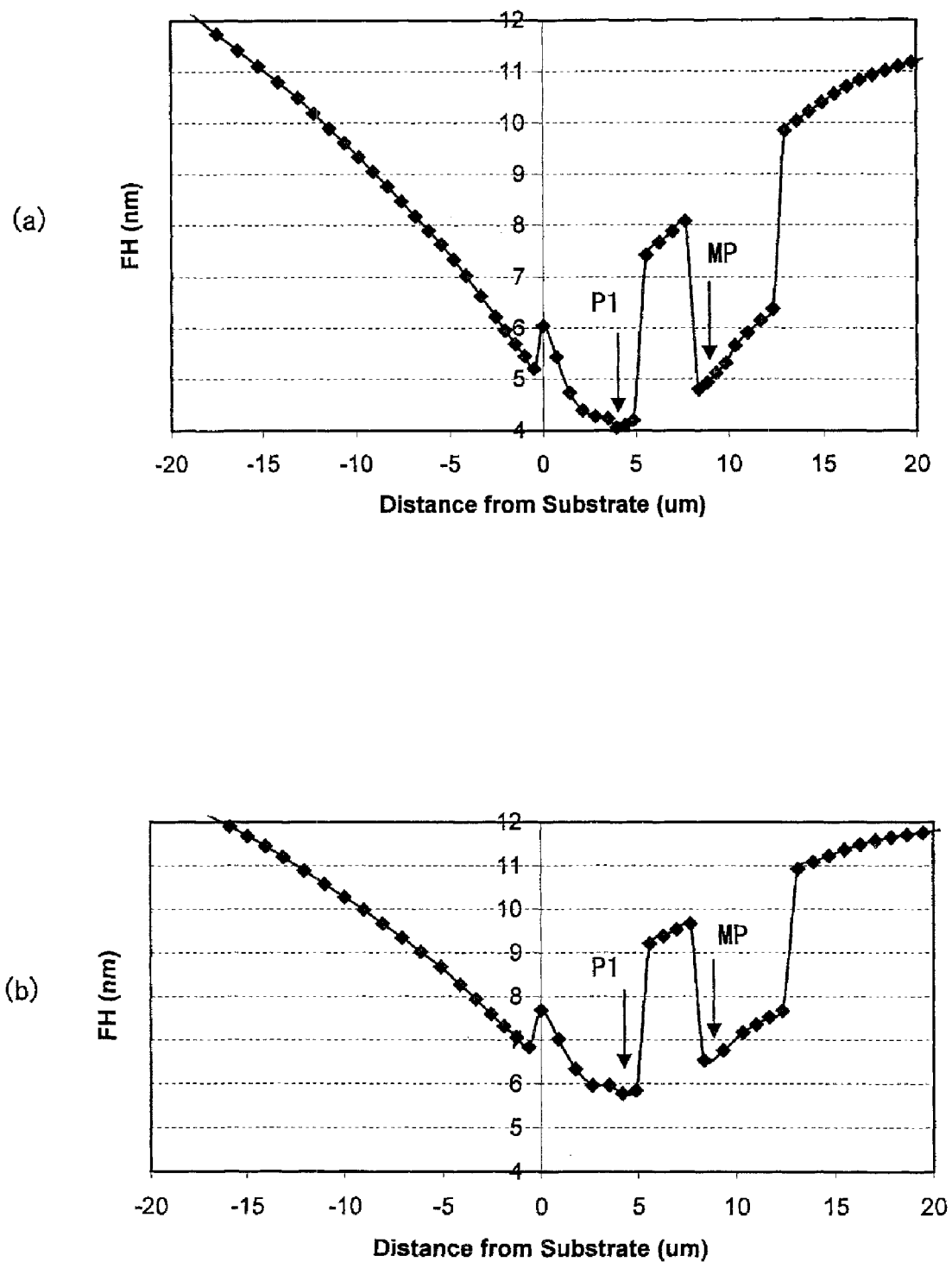
FIG. 10 are example drawings showing examples of profiles of the flying surface of a magnetic-recording head, according to conventional art with relevance to embodiments of the present invention.

As explained with reference to FIG. 10, the protrusion amount varies depending on the position on the flying surface of the magnetic-recording head 1. The aim of control of the protrusion amount of the magnetic-recording head 1 is the control of the magnetic spacing. Elements facilitate the tip of the sensor element 112 and the pole tip of the main pole 133, which includes the main pole tip 332, to come into proximity with the magnetic-recording disk 2, as much as possible.

In FIG. 1, the tip end of the return pole 131 is recessed from the tip ends of the sensor element 112 and the main pole tip 332 and the distance, which is the spacing, from the magnetic-recording disk is larger than those from the two elements. Thus, in accordance with an embodiment of the present invention, the magnetic spacing control in reading and writing is not disturbed by protrusion of the return pole 131.

With reference now to FIGS. 2(a), 2(b) and 2(c), in accordance with embodiments of the present invention, example drawings are shown that schematically depict the configuration of the magnetic-recording-head structure shown in FIG. 1 when viewed from other points of view. FIG. 2(a) is a drawing of a portion of the magnetic-recording head 1 when viewed from the flying surface side, where the upper shield 113, the lower shield 111, the sensor element 112, the return pole 131, and the main pole 133, which includes the main pole tip 332, are shown. FIG. 2(b) schematically depicts the main pole 133 and the return pole 131 when viewed from the trailing-edge side. FIG. 2(c) is an enlarged view of the section enclosed by a dashed circle in FIG. 2(b).

FIG. 2(a) depicts the structure of a magnetic-recording head which conforms to self-servo write. There is an offset between the main pole 133 and the sensor element 112 in such a manner that their locations in the radial direction, which are their locations in the left-right direction of the drawing, are different above points on the recording surface of the magnetic-recording disk. As shown in FIGS. 2(a) and 2(b), the return pole 131 has a recess 311 on its flying surface side. The recess 311 is defined by the two inner side faces lying parallel and opposite to each other in the width direction and a distal end face, which is the bottom face, opposite to the disk. The two inner side faces are substantially vertical to the tip end face of the return pole 131. The distal end face, which is the bottom face, 312 of the recess 311 is the tip end face of the return pole 131 shown in FIG. 1.

In one embodiment of the present invention, for the recess 311 for the width, which is the dimension in the disk radial direction, and the location, as shown in FIG. 2(a), the ends on the inner diameter side and on the outer diameter side, which are located at the right and left ends in the drawing, of the recess 311 are located on the inner diameter side and the outer diameter side of the main pole 133 and the sensor element 112, respectively. When viewed in the flying direction of the head-slider, which is the stacking direction of the magnetic-recording head, the tip end faces of the main pole 133 and the sensor element 112 are located within the recess 311. This configuration may reduce the effects of the return pole 131 to the magnetic spacing control of the main pole yoke 331, or alternatively, the sensor element 112. In another embodiment of the present invention, depending on the design, either element may be formed outside of the position overlapping the recess 311.

As shown in FIGS. 2(b) and 2(c), the inside of the recess 311 is filled with alumina 16 as a protection film. The flying surface of the magnetic-recording head 1 is covered with a carbon overcoat 17. As shown in the partial enlarged view of FIG. 2(c), the carbon overcoat 17 covers the tip end surface 313, which is the end surface outside of the recess, and the end surface 161 of the alumina 16 in the recess 311. As shown in FIG. 2(c), the overcoat 17 is formed step-like over the recess 311.

The end surface 161 of the alumina 16 in the recess is recessed from the tip end face 313 of the return pole outside the recess, which is in a location disposed farther from the disk, and a gap G1 is located between them. In other words, the recess 311 of the return pole 131 is not completely filled with the alumina 16 and a shallow recess remains. The gap G1 is several nanometers deep. On the other hand, the height, or alternatively, the depth, depending on the reference, of the recess 311 is typically about 1 micrometer (µm). The thickness of the overcoat 17 is substantially uniform so that the overcoat 17 shows the step-like shape along with the above-described shallow recess. The overcoat 17 includes a projected portion toward the bottom of the recess, which lies in the direction away from the flying surface, so as to fill the shallow recess.

Since the thickness of the overcoat 17 is substantially uniform, the overcoat 17 has a recess corresponding to the above-described projected part; the recess 171 is formed at substantially the same position as the recess 131 of the return pole 131 in the direction of the normal to the disk. The depth of the recess 171 is indicated by G2, which is substantially the same as G1. In this way, on the end face of the overcoat 17, the recess 171 is formed at the position corresponding to the recess 311 of the return pole 131.

The level of the tip end face 313 outside the recess of the return pole 131 is substantially even with the tip end face of the main pole 133, and the end face, which is an exposed surface, of the overcoat 17 stacked on top of the tip end face and the return pole 131 is also substantially even. Accordingly, the exposed bottom face 172 of the recess 171 of the overcoat 17 is located recessed from the exposed surface of the overcoat coating the tip end face of the main pole 133, which is farther from the magnetic-recording disk 2, and a gap G2 of several nanometers exists between them.

In this way, in the initial state with the heater off, the bottom surface 172 in the recess 171 of the overcoat 17 is farther than the exposed surface of the overcoat 17 stacked on the tip end surface of the main pole 133 in distance, which is the spacing, from the magnetic-recording disk by several nanometers. Hence, when the heat from the heater element 15 expands the return pole 131 and the main pole 133, the spacing at, corresponding to the overcoat covering, the tip of the return pole 131 may be larger to prevent the return pole from becoming a disturbance to the protrusion control, which is associated with the magnetic spacing control, of the main pole 133.

Figure 2:
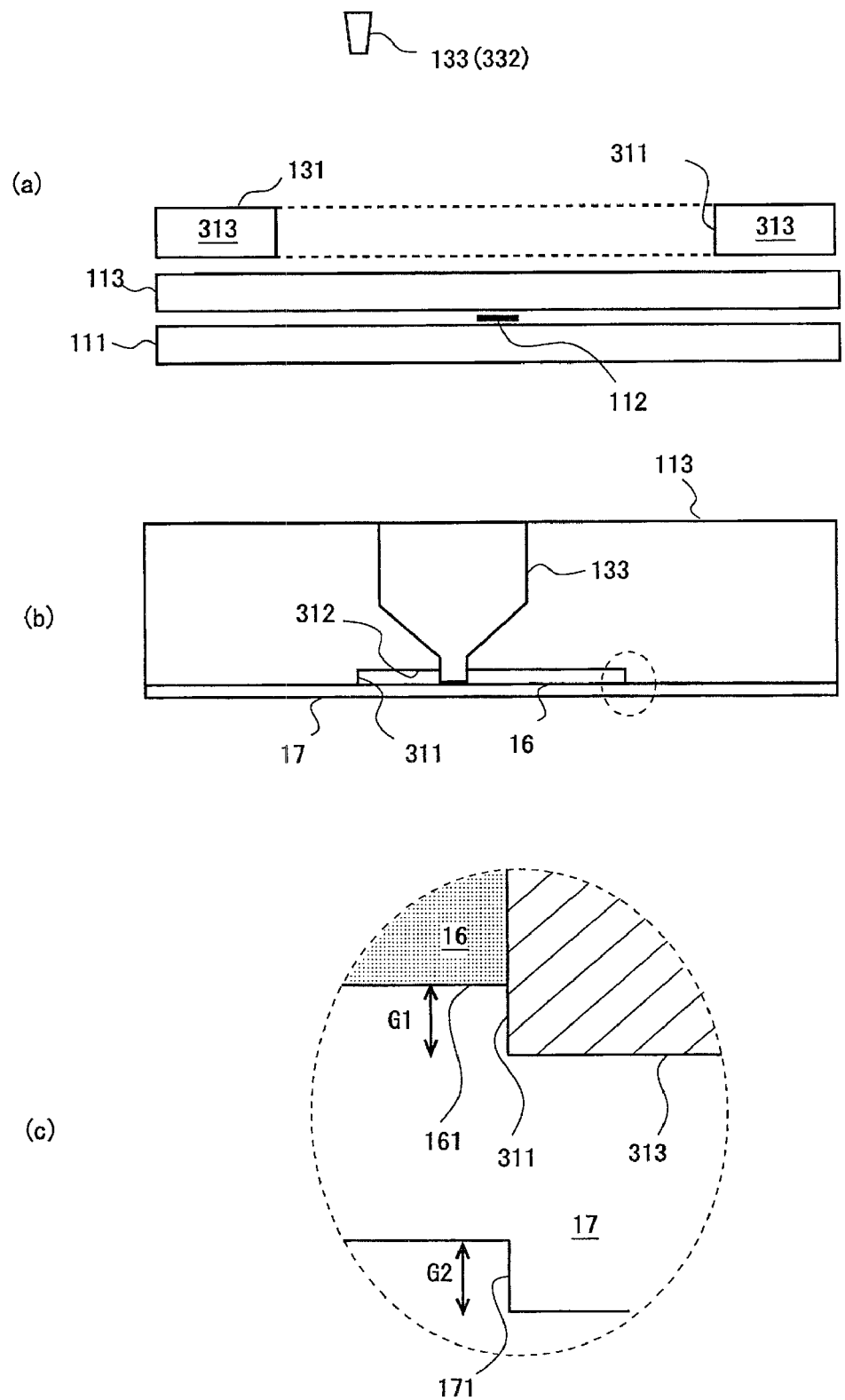
FIGS. 2(a), 2(b) and 2(c), are example drawings schematically depicting the magnetic-recording-head structure shown in FIG. 1 when viewed from other points of view, in accordance with an embodiment of the present invention.

With reference now to FIGS. 3(a), 3(b) and 3(c), in accordance with embodiments of the present invention, example drawings are shown that schematically depict the return pole 131, the upper shield 113, and the lower shield 111 in the magnetic-recording-head structure shown in FIGS. 1 and 2. FIGS. 3(a), 3(b) and 3(c) are views when viewed from the trailing-edge side. The upper shield 113 has the same shape as the lower shield 111. The tip end faces of the shields 111 and 113 are coated with the overcoat 17. Unlike the return pole 131, these shields 111 and 113 do not have a recess, and their end faces are flat. Accordingly, the exposed surfaces, which are end faces, of the overcoat 17 are also flat.

The level, which is the position in the above-described direction of depth, of the tip end face of the sensor element 112 is substantially even with the tip end faces of the shields 111 and 113. Further, these positions are substantially even with the one of the tip end face of the main pole 133. Hence, the spacing between the exposed surface of the overcoat 17 and the magnetic-recording disk 2 is greater at the recess 171 of the overcoat 17 at the end of the return pole 131 and smaller at the end of the sensor element 112. Consequently, when the heat from the heater element 15 causes protrusions of the return pole 131 and the sensor element 112, the structure may prevent the return pole from becoming a disturbance to the protrusion control, which is associated with the magnetic spacing control, of the sensor element 112.

With reference now to FIGS. 4(a) and 4(b), in accordance with embodiments of the present invention, example drawings are shown for which a magnetic-recording head has another magnetic-recording-head structure that is next described. In the magnetic-recording-head structure, a write element 13 includes two return poles. In FIG. 4(a), the write element 13 includes an upper return pole 135 in addition to a lower return pole 131. The lower return pole 131 is not connected to a main pole 133 through magnetic metal. On the other hand, the upper return pole 135 is connected to the main pole 133 through a back-gap portion 136. The write element 13 further includes a second thin film coil 137.

As shown in FIG. 4(a), the magnetic-recording-head structure includes two heater elements 15a and 15b. The heater element 15a is formed at the same position as the heater element 15 which has been described with reference to FIG. 1. The heater element 15b is formed in the layer between the lower return pole 131 and the main pole 133. The heater element 15b is located closer to the write element 13 than the heater element 15a. These plurality of heater elements lead to easy control of the deformation of the disk facing surface by thermal expansion.

Figure 3:
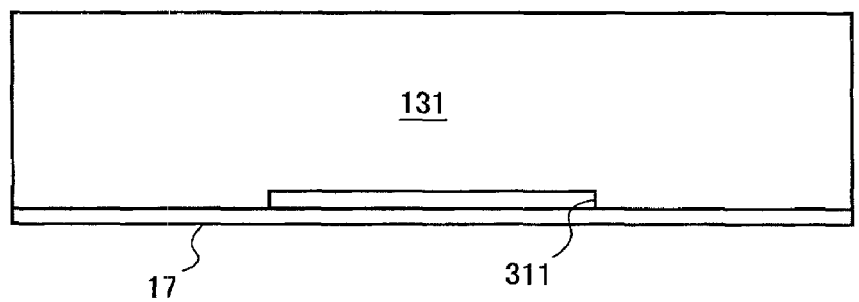
FIGS. 3(a), 3(b) and 3(c) are example drawings schematically depicting a return pole, an upper shield, and a lower shield in the magnetic-recording-head structure shown in FIGS. 1 and 2, in accordance with an embodiment of the present invention.
Figure 3:
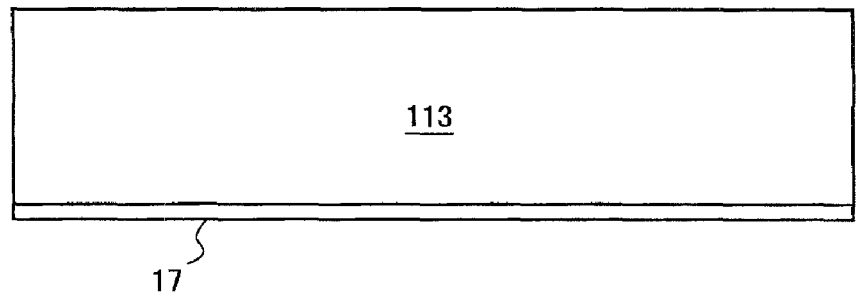
Figure 3:
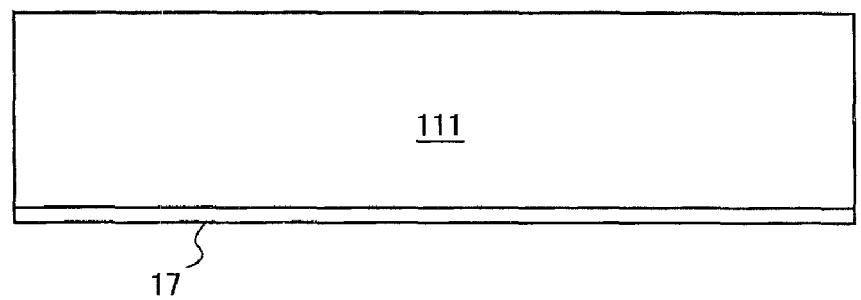
Figure 4:
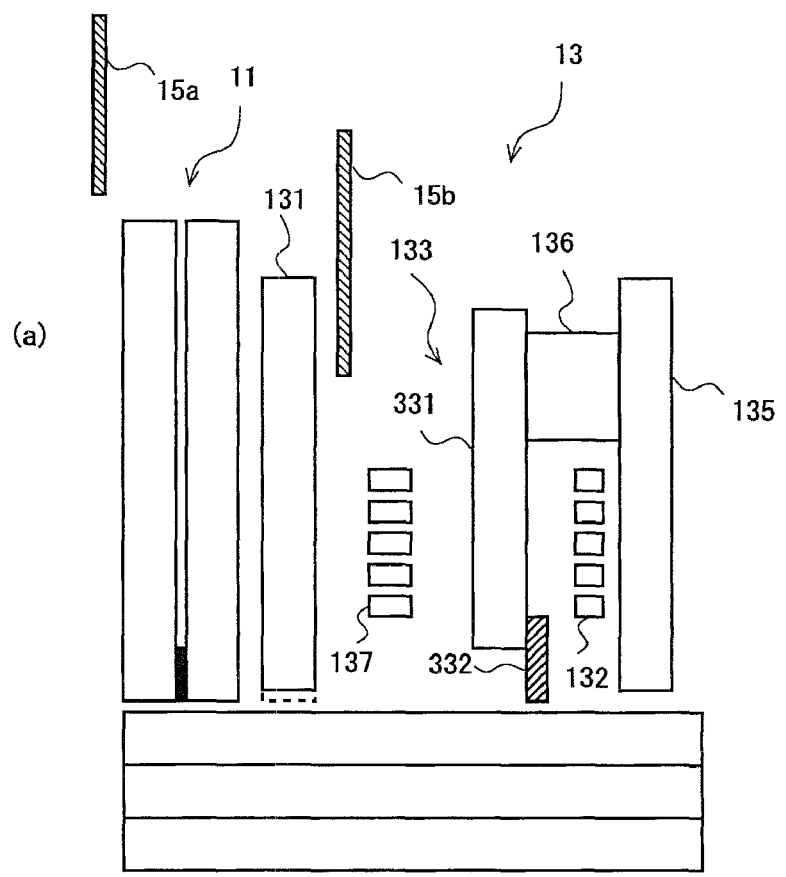
FIGS. 4(a) and 4(b) are example drawings schematically depicting a magnetic-recording head having another magnetic-recording-head structure, in accordance with an embodiment of the present invention.
Figure 4:
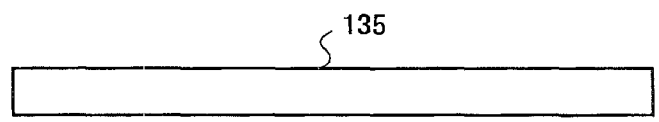
Figure 4:
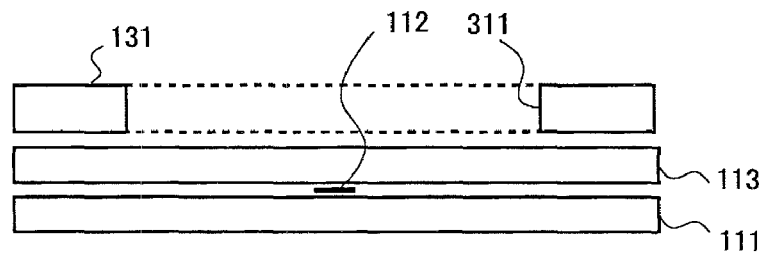

In the magnetic-recording-head structure shown in FIG. 4, a recess formed in a return pole is also effective. As shown in FIGS. 4(a) and 4(b), the shape of the return pole 131 is the same as the one described with reference to FIGS. 1 to 3. The return pole 131 has a recess 311 at the tip. Consequently, when the heat from the heater elements 15a and 15b causes protrusions of the return pole 131, the sensor element 112, and the main pole 133, the structure may prevent the protrusion of the return pole 131 from becoming a disturbance to the magnetic spacing control.

In the case that the write element 13 includes two return poles like the configuration in FIG. 4, one of them, or alternatively, the both of them, may have a recess at the tip end face. The purpose of the formation of a recess in a return pole is to prevent contact between, at the overcoat of, the return pole and the magnetic-recording disk from disturbing the magnetic spacing control of the sensor element, or alternatively, the main pole. Accordingly, a recess with a proper shape is provided at a proper position in accordance with simulations, or measurement, depending on the magnetic-recording-head structure. Specifically, the return pole which is located closer to the heater element is easy to extend, so if one heater element is provided, a recess may be formed in the tip end face, which is the disk facing face, of the return pole that is closer to the heater element.

With reference now to FIGS. 5(a), 5(b) and 5(c), in accordance with embodiments of the present invention, drawings are shown that schematically depict yet another magnetic-recording-head structure. The aforementioned magnetic-recording-head structures have a recess in a return pole. In the present configuration, a recess is formed in the upper shield 113 in addition to the return pole 131. FIG. 5(a) schematically depicts the configuration of the read element 11 and the return pole 131 when viewed from the flying surface side, for example, when viewed from the magnetic-recording disk. The shape of the return pole 131 is the same as the one described with reference to FIGS. 1 to 3. The structure of the read element 11, except for the upper shield 113, is the same as the one described with reference to FIGS. 1 to 3.

The upper shield 113 has a recess 412 on the edge between the tip end face 411, which is the disk facing face, and the top end face, which is the face opposite to the return pole 131. FIG. 5(b) is a perspective view schematically depicting the recess 412 of the upper shield 113. As shown in FIG. 5(c), a portion of the recess 412 is filled with alumina 18 and another portion thereof is filled with overcoat 17.

As shown in FIGS. 5(a) to 5(c), the recess 412 does not penetrate the upper shield 113 in the stacking direction of the magnetic-recording head and is formed only on the trailing-edge side of the upper shield 113, which is opposite to the return pole 131. Accordingly, the lower portion of the tip end face 411 and the under face of the upper shield 113 are flat. The recess 412 is defined by four faces: two inner side faces lying parallel and opposite to each other in the width direction, the distal end face, which is the bottom face, which is farthest from the flying surface, and the face on the trailing-edge side of the upper shield 113.

The upper shield 113 is designed to provide magnetic shield performance for the sensor element 112. The recess 412 formed on the upper side of the shield 113 without penetrating the shield 113 may suppress adverse effects on the shield function provided by the upper shield 113 to the sensor element 112. If possible in designing, a recess penetrating from the upper face to the lower face, which lies in the flying direction, may be formed.

In the overcoat 17 coating the tip end surface, which is located in proximity to the flying surface of the magnetic-recording head, of the upper shield 113, a recess 174 is formed because of the recess 412. The relationship between the recess 412, the alumina 18, and the recess 174 is the same as the relationship between the recess 311, the alumina 16, and the recess 171 described with reference to FIG. 2(c). The end surface of the alumina 18 marginally recessed into the recess 412, and along with the end surface of the alumina 18, a portion of the overcoat 17 includes a protrusion entering the recess 412. The thickness of the overcoat 17 is substantially uniform, so a recess 174 of the overcoat 17 is formed corresponding to the protrusion entering the recess 412 of the upper shield 113.

In FIG. 5(a), the width, which is the dimension in the disk radial direction or the left-right direction in FIG. 5(a), of the recess 412 of the upper shield 113 is the same as the one of the recess 311 of the return pole 131. Furthermore, their locations in the disk radial direction are the same. In the actual design, the dimensions of the recess 412 of the upper shield 113 may be selected appropriately for the magnetic-recording-head structure. The upper shield 113 is located adjacent to the sensor element 112; the effects on magnetic spacing control are small.

In accordance with an embodiment of the present invention, to reduce the effects on the shield function, the recess 412 has a smaller width than the recess 311 of the return pole 131. In general, when viewed in the stacking direction of the magnetic-recording head, the sensor element 112 is located within the recess 412. Furthermore, the recess 412 is located within the recess 311 of the return pole 131.

The depth, which is the distance from the end face, of the recess 412 of the upper shield 113 does not need to be the same as that of the recess 311 of the return pole 131. What reduces the effect on the magnetic spacing is not the recesses of the return pole 131 and the upper shield 113; but, the recesses of the overcoat 17 formed thereby. As described above, the recess of the overcoat 17 depends on the area in the recess remaining after being filled with alumina. Therefore, it is sufficient that the recesses of the return pole 131 and the upper shield 113 have depths deeper than those of the recesses formed in the overcoat 17.

Figure 6:
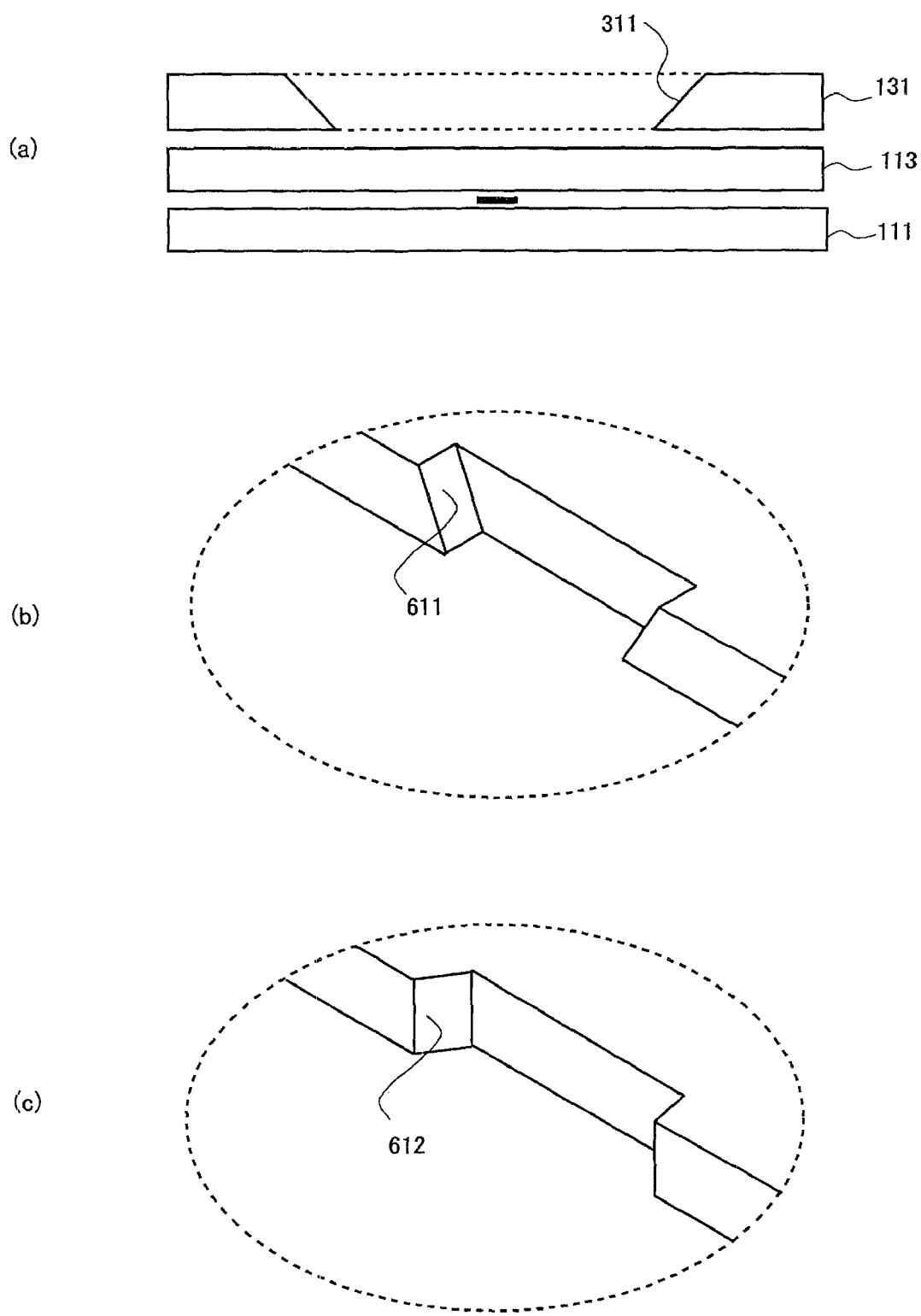
FIGS. 6(a), 6(b) and 6(c) are example drawings schematically depicting other shapes of the return pole having a recess, in accordance with an embodiment of the present invention.

With reference now to FIGS. 6(a), 6(b) and 6(c), in accordance with embodiments of the present invention, another shape of a return pole including a recess is next described. FIG. 6(a) depicts a read element 11 and a return pole 131 when viewed from the flying surface side, and FIG. 6(b) depicts the shape of the return pole 131 when viewed from the trailing-edge side. FIG. 6(c) depicts another shape of the return pole 131 and is a drawing when viewed from the trailing-edge side.

If a recess 311 is formed on the return pole 131, magnetic field is likely to concentrate on its corner so that the magnetic field may adversely affect the magnetized information on the magnetic-recording layer 21. In one embodiment of the present invention, to reduce the effect, the side faces defining the recess 311 are tapered. In FIG. 6(b), the two tapered side faces 611 exposed to the recess 311 are slanted in the stacking direction, which is the flying direction, and the spacing between the two side faces 611, which is the width of the recess 311, gradually decreases from the trailing-edge side toward the leading-edge side. Typically, both of the two side faces 611 are tapered surfaces.

In the shape of FIG. 6(c), the two side surfaces 612 exposed to the recess 131 are slanted in the direction away from the flying surface. The spacing between the two side surfaces 612, which is the width of the recess 131, gradually decreases in the direction away from the flying surface at the tip end toward the distal end of the recess. Such a shape may reduce the magnetic field concentration. The shape of the tapered surface is not limited to the above two shapes. For example, the tapered surface may have a combination of the slants shown in FIGS. 6(b) and 6(c). Similarly, in another embodiment of the present invention, when a recess is formed on the upper shield 113, the side faces of the recess are tapered surfaces. In forming a recess in the upper shield 113 as described with reference to FIG. 5, one of the configurations is a multilayered upper shield 113, an example of which is next described.

Figure 7:
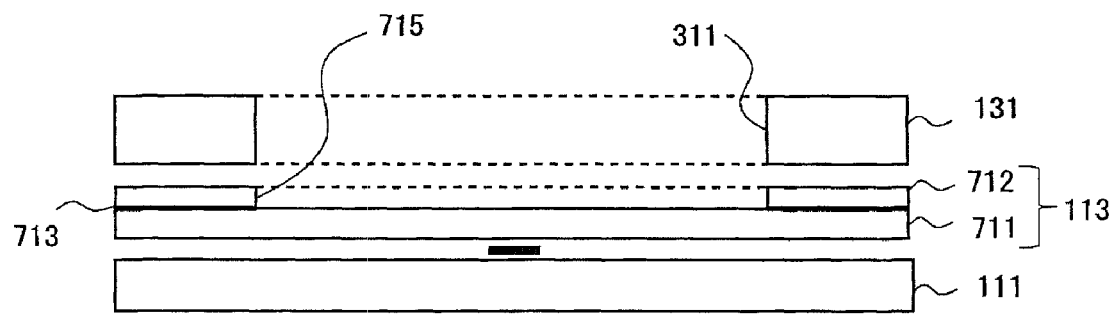
FIG. 7 is an example drawing schematically depicting an example in which the upper layer is formed of two magnetic layers, in accordance with an embodiment of the present invention.

With reference now to FIG. 7, in accordance with embodiments of the present invention, an example drawing is shown that schematically depicts an example in which the upper shield 113 is formed of two magnetic layers 711 and 712. Between the magnetic layers 711 and 712, a non-magnetic layer 713 is interposed. The non-magnetic layer 713 is made of ruthenium, for example. The magnetic layer 711 includes a recess 715. The recess 715 of the magnetic layer 711 functions similarly to the recess 412 described with reference to FIG. 5.

Figure 5:
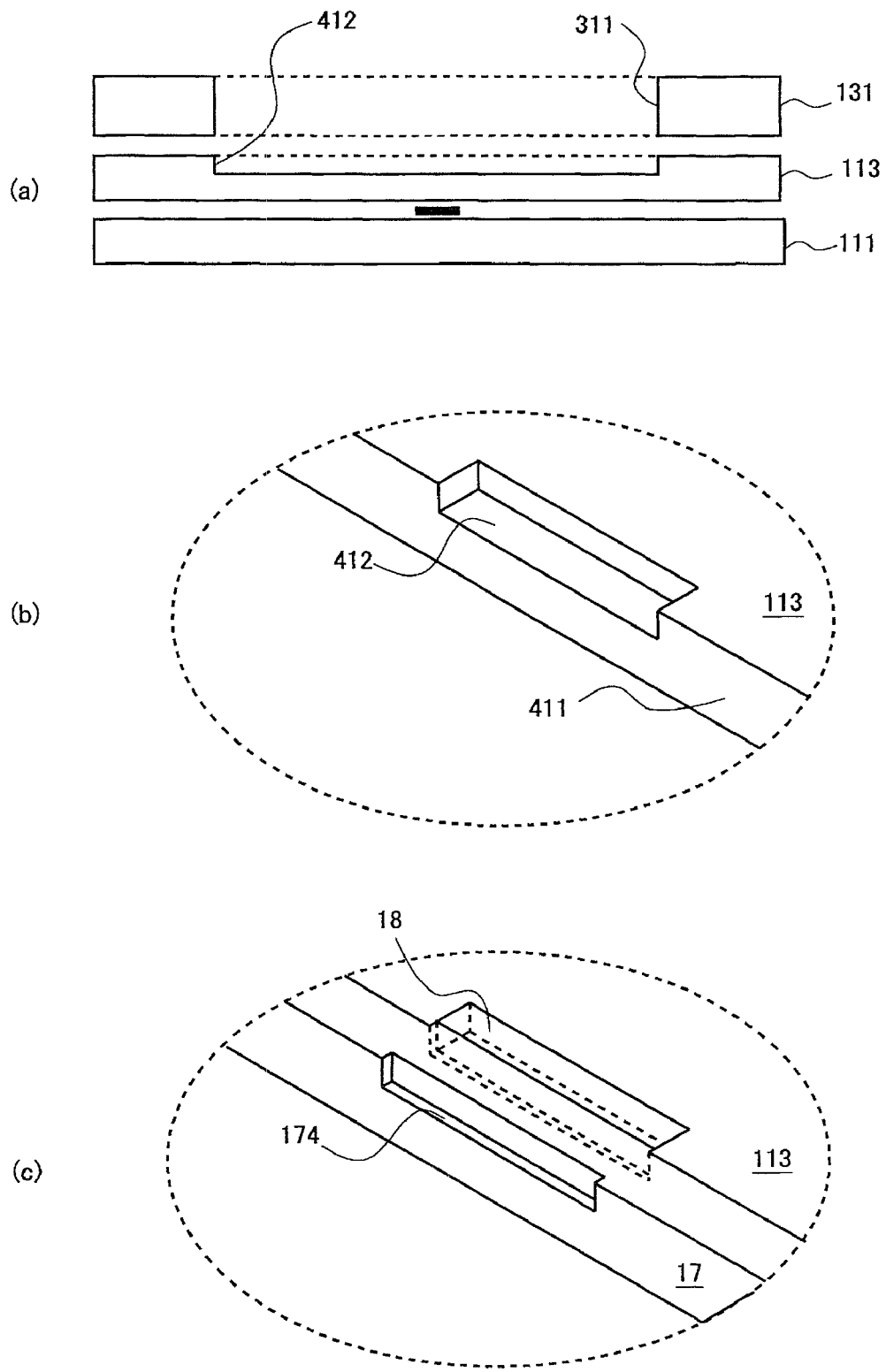
FIGS. 5(a), 5(b) and 5(c) are example drawings schematically depicting a magnetic-recording head having yet another magnetic-recording-head structure, in accordance with an embodiment of the present invention.

In this way, the multilayered upper shield 113 may be easily formed in various shapes depending on the design of the upper shield 113. In particular, as shown in FIGS. 5 and 7, a recess which is not penetrating in the stacking direction may be easily formed by deposition of the upper magnetic layer 711 by sputtering or plating, or by etching thereof. This method may be applied to the forming of a recess in the return pole 131. The configuration of the return pole 131 formed of multiple magnetic layers separated by non-magnetic layers easily allows various shapes of the recess.

Figure 8:
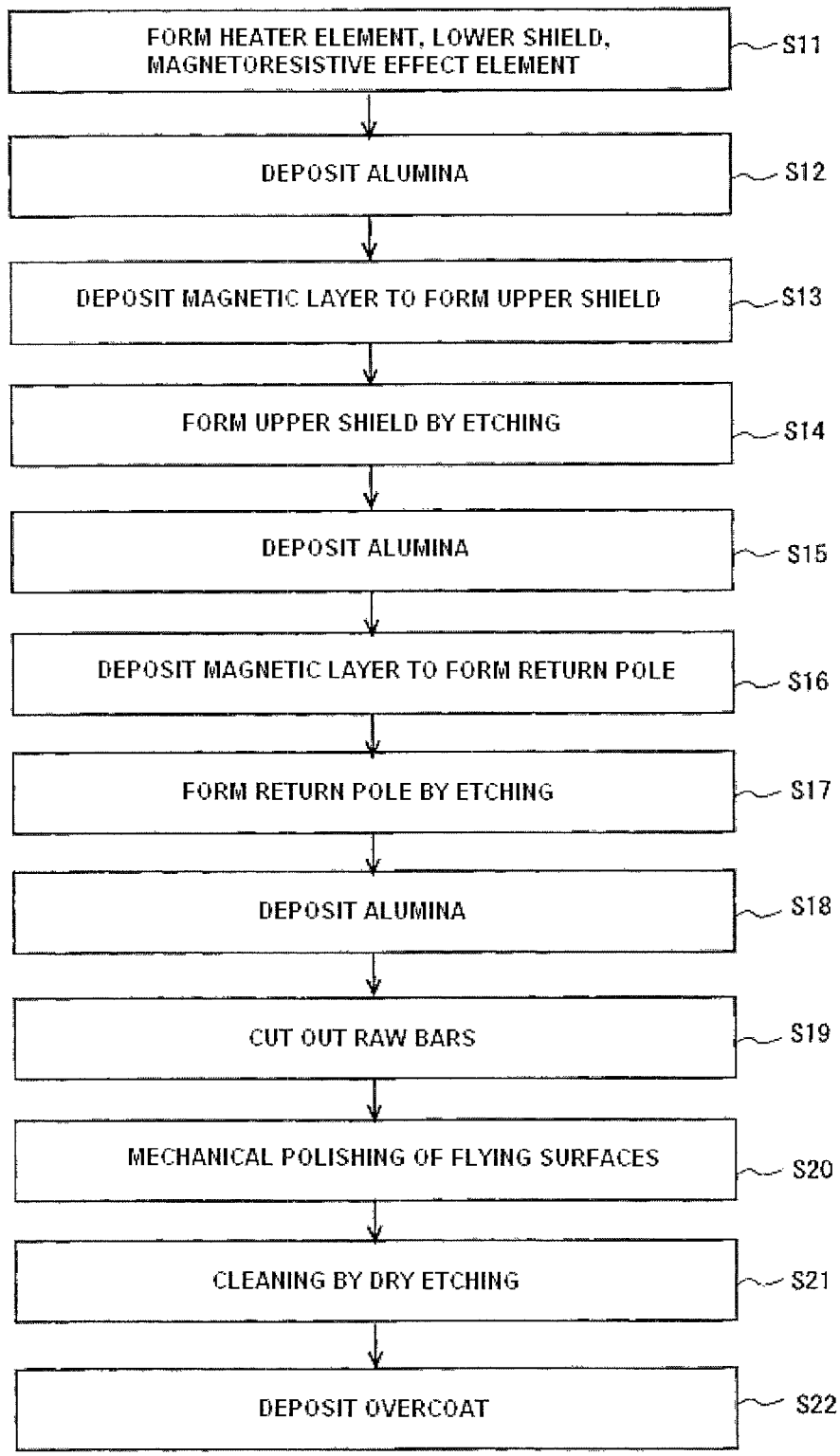
FIG. 8 is an example flowchart illustrating a manufacturing method of the magnetic-recording head, in accordance with an embodiment of the present invention.

With reference now to FIG. 8, in accordance with embodiments of the present invention, a flowchart is shown of a manufacturing method of a magnetic-recording head. As an example, the manufacturing operations of the structure illustrated in FIGS. 1 to 3 are next described. At S11, the method forms by a standard wafer process a heater element 15, a lower shield 111, and a sensor element 112 on the wafer which includes the slider. At S12, the method deposits alumina on the formed layers, and then, at S13, deposits a magnetic layer to form an upper shield 113. In deposition of the materials, sputtering may be used. Then, at S14, the method etches the deposited magnetic layer to form the upper shield 113. In the case of forming a recess 412 in the upper shield 113, the recess 412 is formed in this etching operation. After forming the upper shield 113, at S14, at S15, the method further deposits alumina. If the upper shield has a recess 412, the whole area of the recess 412 is filled with alumina. At S16, the method deposits a magnetic layer to form the return pole 131 by sputtering, and then, at S17, forms the return pole 131 by etching. At this time, the recess 311 of the return pole 131 is formed. At S18, the method deposits alumina on the return pole 131 to fill the whole area of the recess 311 with alumina. Then, the method forms constituent elements of the write element 13, such as a coil 132, a back-gap portion 134, and a main pole 133, and finally deposits alumina to form a magnetic-recording head.

With further reference to FIG. 8, in accordance with embodiments of the present invention, after the wafer process for forming a magnetic-recording head has ended, at S19, the method cuts out strip-like row bars from the wafer with a dicing saw. A row bar includes a plurality of sliders and their flying surfaces are processed. Specifically, at S20, the method performs mechanical polishing of the flying surfaces using a rotational lapping wheel with embedded diamond abrasive grains so that the throat height of the write element and the stripe height of the sensor element of the magnetic-recording head 1 are defined. Then, at S21, for the main purpose of removing conductive smears formed on the flying surface, the method cleans the flying surface by dry etching using an ion beam, or plasma. In this etching operation, at S21, the alumina filling the recess 311, and/or the recess 412, is removed so that a portion of the recess 311, and/or the recess 412, appears as a space. This is due to the difference in etching speed between alumina and the magnetic metal forming the magnetic pole. As described with reference to FIG. 2, the depth of the recess, which is a hole, or space, created at this time is several nanometers. After this etching process, at S21, the method deposits an overcoat 17 of diamond-like carbon (DLC) on the flying surface of the magnetic-recording head, at S22. In the deposition of the overcoat 17, a recess 171 is formed on the overcoat 17 corresponding to the recess formed along with the recess 311, and/or the recess 412.

In this way, recesses are formed in the elements, for example, in the return pole and the upper shield, which are formed by a wafer process, for example, a lithography process, so the recess 171 in the overcoat 17 may be formed at an accurate position and with accurate size. Moreover, the recess 171 is formed in an etching process, which is a common process, so additional process operations are not performed, whereby a recess on the order of several nanometers may be attained easily and accurately.

As set forth above, embodiments of the present invention have been described by way of examples; but, embodiments of the present invention are not limited to the above examples. A person skilled in the art may easily modify, add, or convert the components in the above examples within the scope and scope of embodiments of the present invention. For example, embodiments of the present invention may be applied to disk drives other than HDDs.

For example, for protection of a magnetic-recording head, an overcoat may cover the flying surface of the magnetic-recording head. Depending on the magnetic-recording-head design, however, the overcoat may be omitted. In this case too, a portion of the recess of the return pole, or of the shield, is exposed to the flying surface so that the effects of embodiments of the present invention may be attained. In addition, if acceptable in manufacturing or designing, a recess formed on the return pole, or on the shield, may be coated directly with an overcoat, or alternatively, exposed on the flying surface without being filled with non-magnetic insulating film. In this configuration, the recess is formed on the exposed flying surface, so the effects of embodiments of the present invention may be attained.

The constituent elements described with reference to the drawings may be used individually, or alternatively, may be combined with each other. The configuration described in association with the shield may be applied to the return pole. The configuration described in association with the upper shield may be applied to the lower shield. Embodiments of the present invention may be applied to a magnetic-recording head having a configuration including two return poles and a single heater element. For example, alumina may be used as the protection film for the non-magnetic insulating film for the magnetic-recording head; but, other materials may also be used. In another embodiment of the present invention, a recess may be formed in the return pole and/or the shield, and the tip end faces, which are the faces closest to the flying surface, of the elements forming the write element; and, elements forming the read element may be uneven.

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments described herein were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A head-slider comprising:
   a slider; and
   a magnetic-recording head formed on said slider comprising:
      a main pole;
   a return pole to which a recording magnetic field from said main pole returns;
      a sensor element;
      a shield provided between said sensor element and said main pole;
   a heater element for adjusting a shape of a flying surface of said magnetic-recording head;
   a first recess provided at a tip end face of at least one element selected from the group consisting of said return pole and said shield, wherein said first recess is formed on an edge between one end face in a stacking direction of said magnetic-recording head and said tip end face;
   wherein one of said elements selected from the group consisting of said return pole and said shield comprises a plurality of stacked layers; and said first recess is formed in one of said plurality of layers; and
   a second recess provided on an exposed flying surface and corresponding to said first recess.

2. The head-slider of claim 1, wherein said first recess is said second recess.

3. The head-slider of claim 1, wherein said first recess is partly filled with a non-magnetic insulating film of said magnetic-recording head and said tip end face of said non-magnetic insulating film is recessed from said tip end face outside said first recess.

4. The head-slider of claim 3, further comprising:
   an overcoat deposited on said flying surface of said magnetic-recording head; wherein said overcoat has said second recess which is formed corresponding to a shape of said first recess which is partly filled with said non-magnetic insulating film.

5. The head-slider of claim 1, wherein said sensor element is formed in a lower layer than said main pole on said slider; said heater element is formed closer to said sensor element than said main pole; said return pole is formed in a layer between said main pole and said sensor element; and said return pole has said first recess on said tip end face thereof.

6. The head-slider of claim 5, wherein said shield is formed in a layer between said return pole and said sensor element; said shield has a third recess in a tip end face thereof; and, said exposed flying surface has a fourth recess corresponding to said third recess.

7. The head-slider of claim 6, wherein said first recess of said return pole is through said return pole in a stacking direction of said magnetic-recording head; and said third recess of said shield is formed on an edge between said tip end face and an end face opposite to said return pole.

8. The head-slider of claim 7, wherein said shield comprises a plurality of stacked layers and said third recess is formed in one layer of said plurality of layers.

9. A manufacturing method of a head-slider that is comprised of a slider and a magnetic-recording head formed on said slider, said manufacturing method comprising:
   forming a write element comprising a main pole and a return pole on a substrate which comprises said slider;
   forming a read element comprising a sensor element and a shield between said main pole and said sensor element on said substrate;
   forming a heater element for adjusting a shape of a flying surface of said magnetic-recording head on said substrate;
   forming a non-magnetic insulating layer surrounding said write element, said read element, and said heater element; wherein formation of one of said elements selected from the group consisting of said return pole and said shield stacks a plurality of layers and forms a recess in one of said plurality of layer; said non-magnetic insulating film filling said recess formed on a tip end face of at least one element selected from the group consisting of said return pole and said shield, wherein said recess is formed on an edge between one end face in a stacking direction of said magnetic-recording head and said tip end face; and
   removing a portion of said non-magnetic insulating film in said recess by dry-etching said flying surface to partly expose said recess after forming said write element, said read element, said heater element, and said non-magnetic insulating film.

10. The manufacturing method of a head-slider of claim 9, further comprising:
    depositing an overcoat on said dry-etched flying surface to form a recess in said overcoat corresponding to a shape of said exposed recess.

11. The manufacturing method of a head-slider of claim 9, wherein said sensor element is formed in a lower layer than said main pole; said heater element is formed closer to said sensor element than said main pole; and
    said return pole having said recess on said tip end face thereof is formed in a layer between said main pole and said sensor element.

12. The manufacturing method of a head-slider of claim 11, wherein said shield having said recess on said tip end face is formed in a layer between said return pole and said sensor element.

13. The manufacturing method of a head-slider of claim 12, wherein said recess of said return pole is formed so as to penetrate said return pole in a stacking direction of said magnetic-recording head; and said recess is formed on an edge between said tip end face of said shield and said end face opposite to said return pole.

14. The manufacturing method of a head-slider of claim 13, wherein said formation of said shield stacks a plurality of layers and forms said recess in one layer of said plurality of layers.

* * * * *